June 15, 1926.
F. T. MALECKI
EQUALIZER FLYWHEEL
Filed Dec. 8, 1924
1,588,795
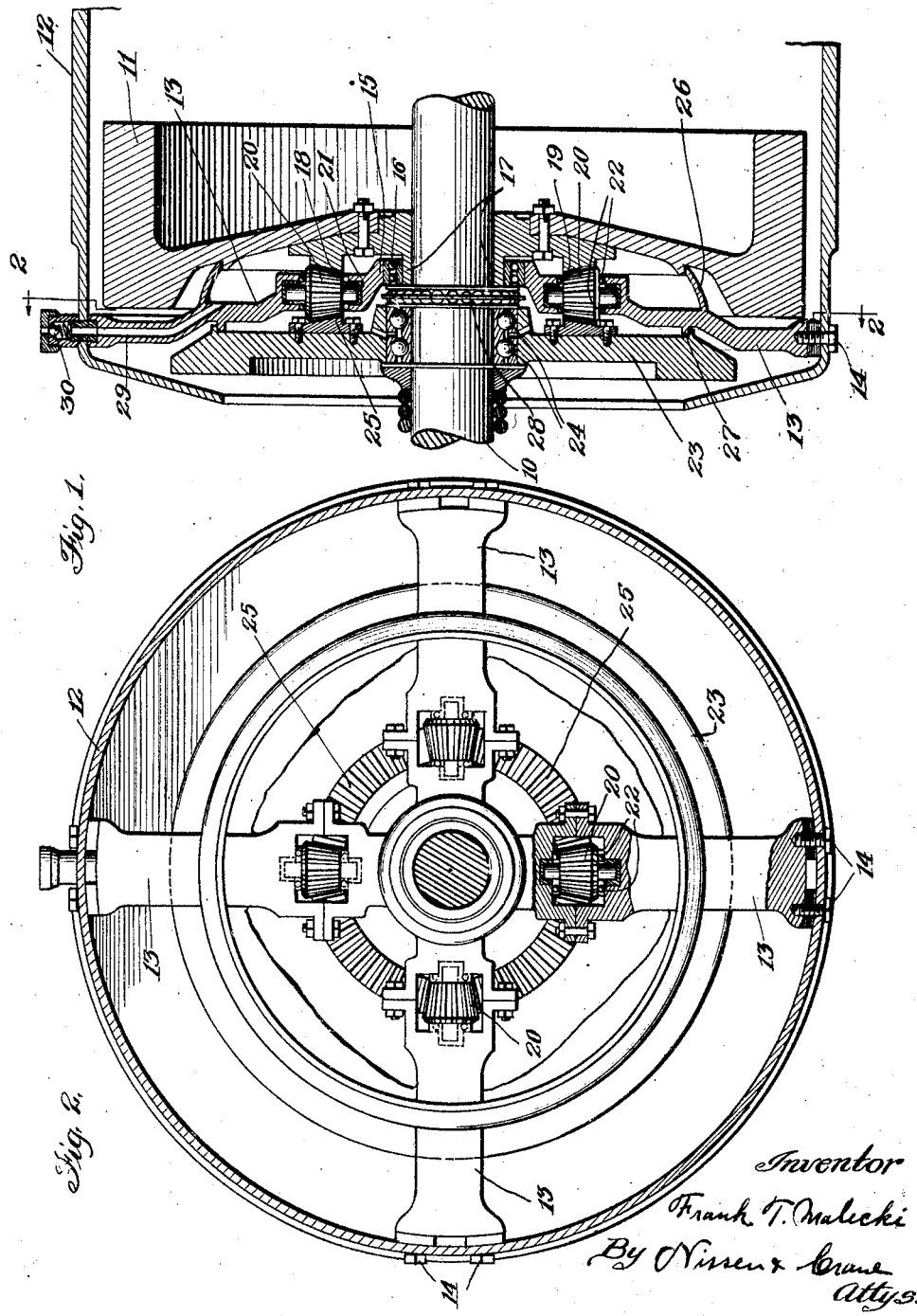

Patented June 15, 1926.

1,588,795

UNITED STATES PATENT OFFICE.

FRANK T. MALECKI, OF CHICAGO, ILLINOIS.

EQUALIZER FLYWHEEL.

Application filed December 8, 1924. Serial No. 754,490.

This invention relates to flywheels for engines, and has for its object the provision of flywheel mechanism which shall eliminate vibration and which shall be of improved construction and operation.

The invention is exemplified in the combination and arrangement of parts shown in the accompanying drawing and described in the following specification, and it is more particularly pointed out in the appended claims.

In the drawing,

Fig. 1 is a sectional view of a flywheel construction showing one embodiment of the present invention.

Fig. 2 is a transverse section substantially on line 2—2 of Fig. 1.

In the operation of engines as now constructed, and especially in the operation of high speed engines such as are used for driving automobiles, there is present at certain speeds a vibration due to the one-way rotation of the moving parts.

The present invention overcomes this vibration by providing a supplemental or equalizer flywheel, which produces a counterbalancing action due to its rotation in a direction opposite to the rotation of the main flywheel. The action of the equalizer flywheel is directed upon the main shaft where vibration is produced through the forces exerted by the one-way moving parts which produce what is known as main shaft whip. The equalizer flywheel by its opposite action counters and eliminates the vibration tendencies and produces an effect directly offsetting the whip incident to the one-way moving parts.

The embodiment of the invention illustrated in the drawing comprises a construction which is simple and practical, which is economical to manufacture, which produces a minimum of frictional resistance and which efficiently eliminates the vibration due to one-way rotation. The moving parts are provided with ball bearings to eliminate friction and are enclosed in a casing which will permit their operation in a suitable lubricant.

In the drawing the numeral 10 designates the main shaft of an engine, as for instance, the engine of an automobile. The shaft 10 is provided with a flywheel 11 of the usual construction, which is enclosed in a housing 12. A spider consisting of four arms 13 is supported on the interior of the housing 12 by cap screws 14 or other suitable fastenings. The inner ends of the arms 13 carry a bearing ring 15 through which the shaft extends, the ring 15 being provided with ball bearings 16 interposed between the spider and the central boss or flange 17 of the flywheel 11. The flywheel 11 is provided with a gear ring 18 having radial gear teeth 19 formed thereon. The arms 13 each carry a bevel pinion 20 having teeth meshing with the teeth 19 on the gear ring 18. Suitable bushings 21 are provided for the pinions 20, and ball bearings 22 are preferably interposed between the pinions and their supporting arms 13. Opposite the arms 13 from the flywheels 11 the equalizer flywheel 23 is mounted. This flywheel is journaled on the shaft 10 and is provided with ball bearings 24 to insure operation with a minimum amount of friction. The gear ring 25 is secured to the equalizer flywheel 23 in position to mesh with the gears 20. The equalizer wheel 23 runs freely on the shaft 10 and will be driven by the pinions 20 in the opposite direction from the rotation of the main flywheel 11 and at the same speed of rotation as the main flywheel. It will thus be seen that the tendency to produce vibration or whip in the main shaft due to the one-way rotation of the parts connected therewith will be offset by the opposite direction of rotation of the equalizer flywheel 23.

In order to facilitate lubrication of the rotating parts and the gears 20, the arms 13 preferably carry flanges 26 and 27, which are disposed closely adjacent cooperating flanges on the flywheels 11 and 23. These flanges in conjunction with the two flywheels constitute an enclosed housing for retaining the lubricating material for the moving parts. Ball bearings 28 are interposed between the two flywheels to permit their relative rotation with a minimum amount of friction. The upper arm 13 may be provided with a lubrication duct 29 through which lubricant may be introduced into the housing formed by the flanges 26 and 27. Any suitable form of closure 30 may be provided for the upper end of the duct 29.

It will be understood that the particular embodiment of the invention shown in the drawing is given by way of illustration, but that various changes may be made by those skilled in the art without departing from the spirit and scope of the invention as defined in the following claims.

I claim:

1. Flywheel construction for engines comprising two coaxial flywheels materially differing from each other in size, and means for rotating said flywheels in opposite directions.

2. Flywheel construction for engines comprising two coaxial flywheels, a shaft on which said flywheels are mounted, one of said flywheels being permanently attached to said shaft while the other is freely rotatable thereon, and means for rotating said flywheels at the same rate of speed in opposite directions.

3. The combination with an engine shaft, of two flywheels mounted on said shaft, one of said flywheels being permanently fixed to said shaft while the other is freely rotatable thereon, and means for causing said flywheels to rotate simultaneously in opposite directions.

4. The combination with an engine shaft, of a flywheel secured to said shaft to rotate therewith, and an equalizer flywheel mounted on said shaft and at all times rotatable thereon in an opposite direction from said first-mentioned flywheel.

5. The combination with an engine shaft, of a flywheel secured to said shaft for rotation therewith, a second flywheel journaled on said shaft, and means for rotating said second flywheel in an opposite direction from the rotation of said first-named flywheel, said second flywheel being freely rotatable on said shaft at all times.

6. The combination with an engine shaft, of a flywheel fixed to said shaft, a second flywheel journaled for rotation on said shaft and freely rotatable thereon at all times, and means for driving said second flywheel in an opposite direction to the rotation of said first flywheel and at substantially the same speed.

7. The combination with an engine shaft, of two flywheels coaxial with said shaft, and gears interposed between said flywheels to cause rotation of said flywheels in opposite directions, one of said flywheels being freely rotatable on said shaft at all times.

8. The combination with an engine shaft, of a flywheel fixed to said shaft, a second flywheel journaled for rotation about the axis of said shaft and free to rotate relative to said shaft at all times, and a gear having a fixed axis interposed between said flywheels for causing rotation of said second flywheel in an opposite direction to the rotation of said first-named flywheel.

9. The combination with an engine shaft, of a flywheel secured to said shaft, gears meshing with said flywheel and disposed diametrically opposite to one another relative to the axis of said shaft, and a second flywheel journaled for free rotation at all times about the axis of said shaft relative to said shaft, said second flywheel having a gear thereon meshing with said first-named gears.

10. The combination with an engine shaft, of a flywheel secured to said shaft and having a gear thereon, a plurality of pinions spaced about the axis of said shaft and meshing with said gear, a second flywheel of less size than said first mentioned flywheel journaled for rotation about the axis of said shaft, and free to rotate at all times relative to said shaft, and a gear secured to said second flywheel and meshing with said pinions.

11. The combination with an engine shaft, of a flywheel secured to said shaft, a plurality of fixed arms arranged radially relative to the axis of said shaft, pinions journaled in said arms, a gear on said flywheel meshing with said pinions, an equalizer flywheel of less size than said first mentioned flywheel journaled for rotation about the axis of said shaft, said equalizer flywheel being free to rotate at all times relative to said shaft, and a gear secured to said equalizer flywheel and meshing with said pinions.

12. The combination with an engine shaft, of a flywheel secured to said shaft, a plurality of fixed arms disposed radially relative to the axis of said shaft, an equalizer flywheel of less size than said first named flywheel and journaled for rotation about the axis of said shaft, said equalizer flywheel being at all times free to rotate relatively to said shaft, gearing supported by said arms for driving said equalizer flywheel in an opposite direction from the direction of rotation of said first-named flywheel, and roller bearings interposed between said arms and said first-named flywheel.

13. The combination with an engine shaft, of a flywheel permanently fixed to said shaft, a second flywheel journaled for rotation about said shaft, means for causing said flywheels to rotate in opposite directions, and ball bearings interposed between said flywheels.

14. The combination with an engine shaft, of a flywheel permanently secured to said shaft, a second flywheel journaled for rotation upon said shaft, ball bearings interposed between said second flywheel and shaft, and gearing for causing said flywheels to rotate in opposite directions.

15. The combination with an engine shaft, of a flywheel permanently secured to said shaft, an equalizer flywheel journaled for rotation about said shaft, pinions interposed between said flywheels, fixed supports for said pinions, and ball bearings interposed between said pinions and fixed supports.

16. The combination with an engine shaft, of two flywheels mounted on said shaft, gearing interposed between said flywheels to produce opposite rotation thereof, and means cooperating with said flywheels to form a housing enclosing said gearing for containing lubricant.

17. The combination with an engine shaft, of a pair of flywheels mounted on said shaft, gearing disposed between said flywheels and operating to cause opposite rotation thereof, fixed supports for said gearing, and means carried by said fixed supports for bridging the space between said flywheels to form a closed housing between said flywheels for containing lubricant.

18. The combination with an engine shaft, of a pair of flywheels mounted on said shaft, gearing interposed between said flywheels for causing rotation thereof in opposite directions, fixed supports for said gearing, flanges on said supports bridging the space between said flywheels to form a closed housing for lubrication for said gearing, and means for introducing lubricating material into said housing.

19. The combination with an engine shaft, of a main flywheel fixed to said shaft, an equalizer flywheel journaled on said shaft, radially disposed arms interposed between said flywheels, pinions supported by said arms, gears on said flywheels meshing with said pinions to cause rotation of said equalizer flywheel in the opposite direction to the rotation of the flywheel fixed to said shaft, ball bearings for said gearing and equalizer flywheel, means cooperating with said flywheels to provide a closed housing for said gearing, and means for supplying lubrication to said housing to lubricate said gearing and ball bearings.

20. The combination with an engine shaft, of a pair of flywheels concentric with said shaft, means for constraining said flywheels to rotate in opposite directions, one of said flywheels being permanently fixed to said shaft while the other is free to rotate relative to said shaft at all times.

21. The combination with a rotating shaft, of a pair of concentric flywheels mounted on said shaft, one of said flywheels being materially larger than the other, said larger flywheel being permanently fixed to said shaft, while said smaller flywheel is free to rotate relative to said shaft at all times, and means connecting said flywheels to cause said flywheels to rotate in opposite directions.

In testimony whereof I have signed my name to this specification on this 5th day of December, A. D. 1924.

FRANK T. MALECKI.